(No Model.) 2 Sheets—Sheet 2.

A. W. CHILCOTT.
GATE OPENING AND CLOSING APPARATUS.

No. 296,528. Patented Apr. 8, 1884.

WITNESSES:
Francis McArdle.
C. Sedgwick

INVENTOR:
A. W. Chilcott
BY Munn & Co.
ATTORNEYS.

United States Patent Office.

AMON W. CHILCOTT, OF MATTOON, ILLINOIS.

GATE OPENING AND CLOSING APPARATUS.

SPECIFICATION forming part of Letters Patent No. 296,528, dated April 8, 1884.

Application filed July 26, 1883. (No model.)

*To all whom it may concern:*

Be it known that I, AMON W. CHILCOTT, of Mattoon, in the county of Coles and State of Illinois, have invented a new and Improved Gate Opening and Closing Apparatus, of which the following is a full, clear, and exact description.

My invention relates to certain improvements in mechanism for operating sliding gates; and it consists in the construction, arrangement, and combination of parts, as will be hereinafter fully described, and specifically set forth in the claim.

Reference is to be had to the accompanying drawings, forming part of this specification, in which similar letters of reference indicate corresponding parts in all the figures.

Figure 1:
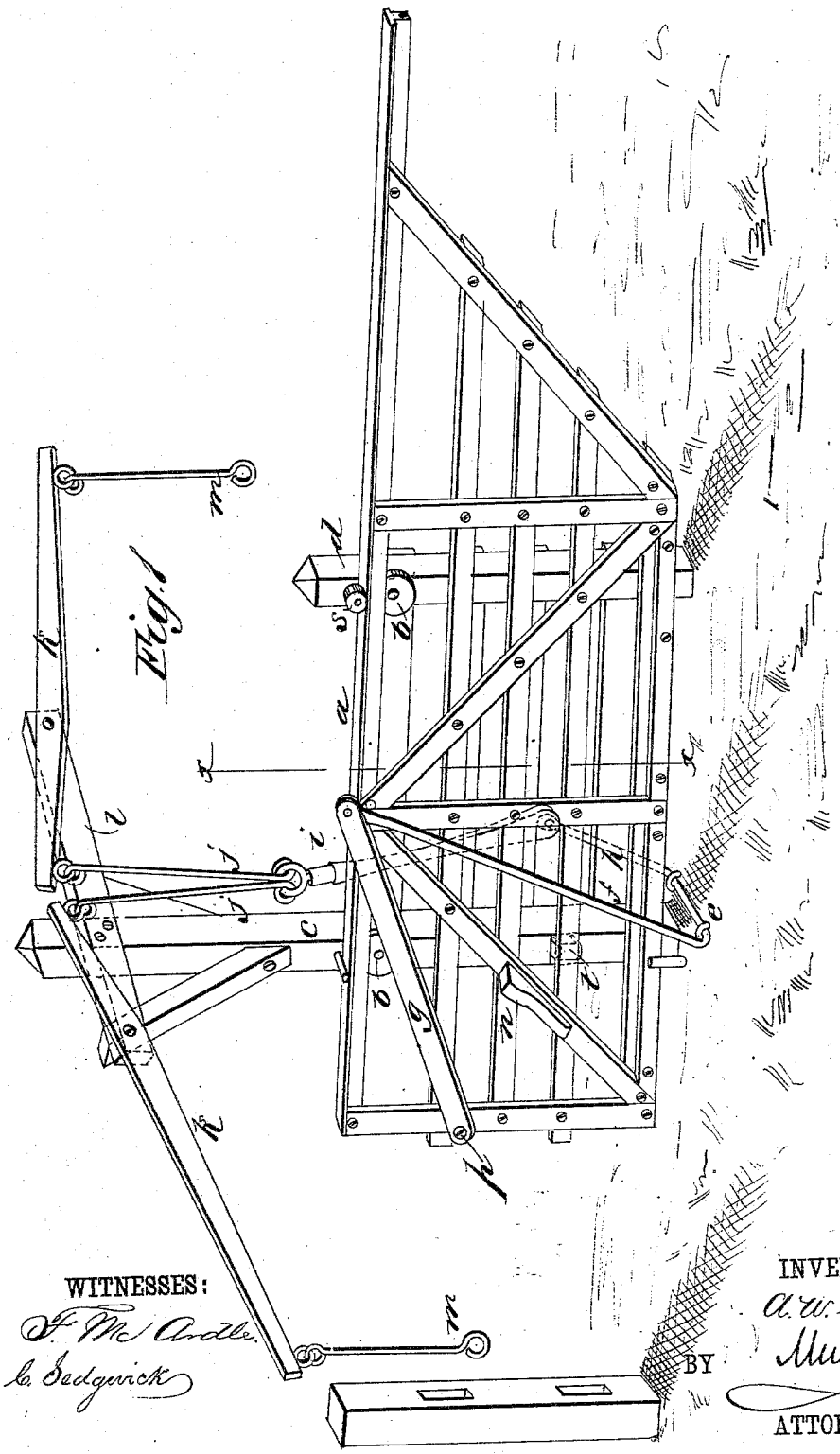
Figure 2:
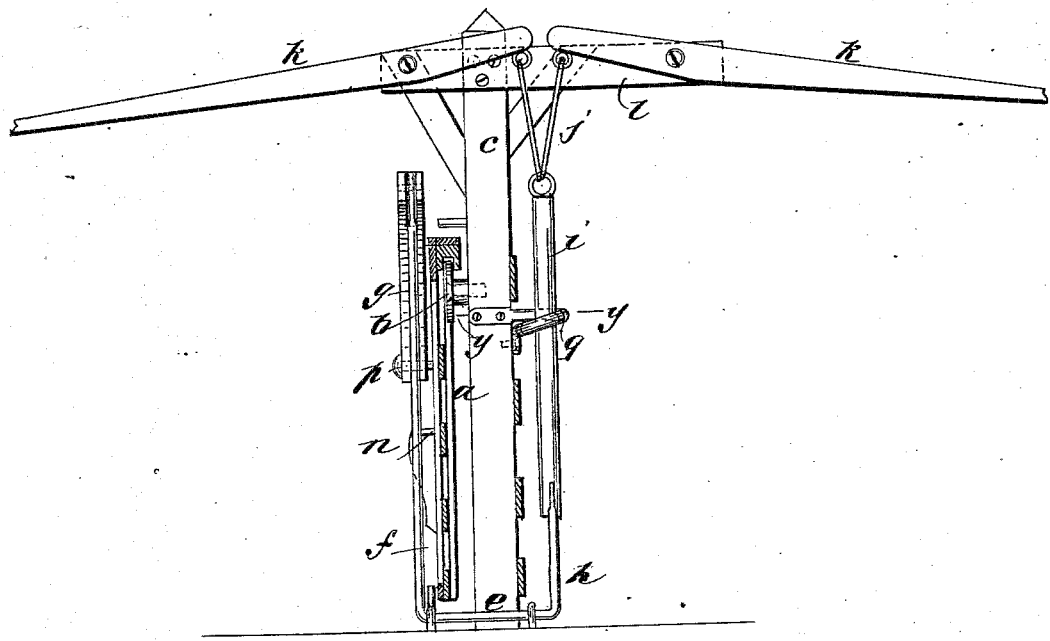
Figure 3:
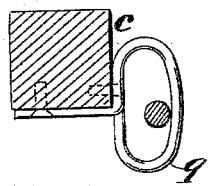

Figure 1 is a perspective view of a sliding gate provided with my improved apparatus, said gate being partly open. Fig. 2 is a transverse section on the line $x$ $x$ of Fig. 1, and Fig. 3 is a detail in horizontal section on line $y$ $y$ of Fig. 2.

The gate $a$ slides forward and backward on friction-rollers $b$, pivoted on the posts $c$ and $d$, for opening and closing it. The mechanism for operating it consists of the crank-shaft $e$, pivoted under the gate and transversely to it, back of the post $c$, this shaft having an arm, $f$, on one end about equal in length to half the distance the gate travels, and being connected to the front end of the gate by the connecting-rod $g$. Said shaft also has a shorter arm, $h$, on the other end arranged in the plane of arm $f$, and connected by rod $i$ and links $j$ with the levers $k$, pivoted on the cross-bar $l$ at the top of post $c$, which levers extend in opposite directions along the roadway, and have pendent rods $m$, by which to pull the levers down for working the gate. When the gate is closed, connecting-rod $g$ rests on the bracket $n$, attached to the side of the gate, and ranges, together with arm $f$, about in a straight line from pivot $p$ to the shaft, forming an effectual fastening against any attempt to open the gate by pushing it back. When either of the levers $k$ is pulled down with vigor, the arm $f$ is raised and swung over to the right, the momentum of the gate carrying it past the vertical center, so that it falls on the other side of the said center, to be pulled up in like manner by a downward pull on either of the levers $k$, for closing the gate, thus making said gate operative both ways by pulling downward on said levers, which is the best, simplest, and easiest action.

The connecting-rod $i$ is arranged in a guard, $q$, to confine it in its proper place, said guard consisting of a bar of iron bent in the form of a loop and attached to post $c$. The rod works in the loop, which has the necessary length and breadth to allow the play of the rod required by the sweep of the arm $h$. Said guard also allows the gate to be started either way by pushing the rod $i$ sidewise to change the line of force in case the gate should stop on the center.

A guide-roller, $s$, is arranged on post $d$ over the gate, and a side guide-roller, $t$, is arranged on post $c$ near the bottom, for steadying the gate laterally.

My invention is an improvement upon the gate described in my Patent No. 272,646, granted on the 20th of February, 1883, whereby I make the operation much more certain, easy, and convenient.

What I claim as new and of my invention is—

In a gate opening and closing mechanism, the combination, with the pivoted levers $k$ above and on either side of the gate, connected at their inner ends with the rod $i$ by means of the links $j$, of the crank-shaft secured beneath the gate, and provided with long and short arms $f$ $h$ parallel to and in the same plane with each other, the latter being connected with the rod $i$ below the center of the gate, and the former being connected to the connecting-rod $g$ above the center of the gate, the connecting-rod $g$ being pivoted to the front part of the gate, substantially as set forth.

AMON W. CHILCOTT.

Witnesses:
TYRA MONTGOMERY,
WILLIAM A. STEELE.